(12) United States Patent
Thomas et al.

(10) Patent No.: US 10,965,745 B2
(45) Date of Patent: *Mar. 30, 2021

(54) METHOD AND SYSTEM FOR PROVIDING REMOTE ACCESS TO A STATE OF AN APPLICATION PROGRAM

(71) Applicant: Calgary Scientific Inc, Calgary (CA)

(72) Inventors: Monroe Milas Thomas, Toronto (CA); David Bruce McFadzean, Toronto (CA); Michael Beauregard, Calgary (CA); Derek Scherger, Calgary (CA)

(73) Assignee: CALGARY SCIENTIFIC INC., Calgary (CA)

(*) Notice: Subject to any disclaimer, the term of this patent is extended or adjusted under 35 U.S.C. 154(b) by 8 days.

This patent is subject to a terminal disclaimer.

(21) Appl. No.: 16/420,391

(22) Filed: May 23, 2019

(65) Prior Publication Data

US 2019/0342385 A1    Nov. 7, 2019

Related U.S. Application Data

(63) Continuation of application No. 15/868,173, filed on Jan. 11, 2018, now Pat. No. 10,334,042, which is a
(Continued)

(51) Int. Cl.
*H04L 29/08* (2006.01)
*H04L 12/12* (2006.01)
(Continued)

(52) U.S. Cl.
CPC ............ *H04L 67/1095* (2013.01); *G06F 9/52* (2013.01); *G06F 19/00* (2013.01); *H04L 12/12* (2013.01); *H04L 67/42* (2013.01)

(58) Field of Classification Search
CPC ..... H04L 67/1095; H04L 12/12; H04L 67/42; G06F 19/00; G06F 9/52
See application file for complete search history.

(56) References Cited

U.S. PATENT DOCUMENTS 4,975,690 A    12/1990  Torres
5,249,121 A     9/1993  Baum
(Continued)

FOREIGN PATENT DOCUMENTS

CA    2646414    10/2007
CA    2697936     3/2009
(Continued)

OTHER PUBLICATIONS

ADASS XXI Conference Schedule, European Southern Observatory, http://www.eso.org/sci/meetings/2011/adass2011/program/schedule.html#day2, Nov. 7, 2011, 4 pages.
(Continued)

*Primary Examiner* — Mohamed A. Wasel
(74) *Attorney, Agent, or Firm* — Meunier Carlin & Curfman LLC (57) ABSTRACT

Methods for providing remote access to an application executing on a remote server. A client computer includes a client remote access program that is used to connect to a server remote access program. At the client computer, a client difference program having encoded data indicative of changes to the application since changes were last received from the server computer is generated and transmitted to the server remote access program. At the server computer, the client difference program is executed to update the application and a server difference program is generated having encoded changes to the application since the changes were last received from the client computer. The server difference program is transmitted to the client computer to update the application.

16 Claims, 7 Drawing Sheets

Related U.S. Application Data continuation of application No. 15/166,515, filed on May 27, 2016, now Pat. No. 9,871,860, which is a continuation of application No. 14/450,491, filed on Aug. 4, 2014, now Pat. No. 9,367,365, which is a continuation of application No. 12/592,473, filed on Nov. 25, 2009, now Pat. No. 8,799,354.

(60) Provisional application No. 61/193,423, filed on Nov. 26, 2008.

(51) Int. Cl.
*G06F 9/52* (2006.01)
*G06F 19/00* (2018.01)
*H04L 29/06* (2006.01)

(56) References Cited

U.S. PATENT DOCUMENTS

| | | | |
|---|---|---|---|
| 5,345,550 A | 9/1994 | Bloomfield | |
| 5,491,800 A | 2/1996 | Goldsmith et al. | |
| 5,555,003 A | 9/1996 | Montgomery et al. | |
| 5,742,778 A | 4/1998 | Hao et al. | |
| 5,844,553 A | 12/1998 | Hao et al. | |
| 5,870,559 A | 2/1999 | Leshem et al. | |
| 5,903,725 A | 5/1999 | Colyer | |
| 5,909,545 A | 6/1999 | Frese, II et al. | |
| 5,920,311 A | 7/1999 | Anthias | |
| 5,978,842 A | 11/1999 | Noble et al. | |
| 5,987,376 A | 11/1999 | Olson et al. | |
| 5,996,002 A | 11/1999 | Katsurabayashi et al. | |
| 6,045,048 A | 4/2000 | Wilz et al. | |
| 6,061,689 A | 5/2000 | Chang et al. | |
| 6,075,531 A | 6/2000 | DeStefano | |
| 6,141,698 A | 10/2000 | Krishnan et al. | |
| 6,145,098 A | 11/2000 | Nouri et al. | |
| 6,151,621 A | 11/2000 | Colyer et al. | |
| 6,253,228 B1 | 6/2001 | Ferris et al. | |
| 6,342,906 B1 | 1/2002 | Kumar et al. | |
| 6,343,313 B1 | 1/2002 | Salesky et al. | |
| 6,453,334 B1 | 9/2002 | Vinson et al. | |
| 6,453,356 B1 | 9/2002 | Sheard et al. | |
| 6,529,230 B1 | 3/2003 | Chong | |
| 6,570,563 B1 | 5/2003 | Honda | |
| 6,601,233 B1 | 7/2003 | Underwood | |
| 6,602,185 B1 | 8/2003 | Uchikubo | |
| 6,662,210 B1 | 12/2003 | Carleton et al. | |
| 6,698,021 B1 | 2/2004 | Amini et al. | |
| 6,742,015 B1 | 5/2004 | Bowman-Amuah | |
| 6,748,418 B1 | 6/2004 | Yoshida et al. | |
| 6,763,371 B1 | 7/2004 | Jandel | |
| 6,792,607 B1 | 9/2004 | Burd et al. | |
| 6,918,113 B2 | 7/2005 | Patel et al. | |
| 6,938,096 B1 | 8/2005 | Greschler et al. | |
| 6,938,212 B2 | 8/2005 | Nakamura | |
| 6,970,459 B1 | 11/2005 | Meier | |
| 6,976,077 B1 | 12/2005 | Lehew et al. | |
| 6,981,062 B2 | 12/2005 | Suryanarayana | |
| 6,996,605 B2 | 2/2006 | Low et al. | |
| 7,003,550 B1 | 2/2006 | Cleasby et al. | |
| 7,065,568 B2 | 6/2006 | Bracewell et al. | |
| 7,069,227 B1 | 6/2006 | Lintel, III et al. | |
| 7,073,059 B2 | 7/2006 | Worely et al. | |
| 7,133,895 B1 | 11/2006 | Lee et al. | |
| 7,149,761 B2 | 12/2006 | Cooke et al. | |
| 7,152,092 B2 | 12/2006 | Beams et al. | |
| 7,167,893 B1 | 1/2007 | Malone et al. | |
| 7,174,504 B2 | 2/2007 | Tsao | |
| 7,181,686 B1 | 2/2007 | Bahrs | |
| 7,191,233 B2 | 3/2007 | Miller | |
| 7,193,985 B1 | 3/2007 | Lewis et al. | |
| 7,197,561 B1 | 3/2007 | Lovy et al. | |
| 7,240,162 B2 | 7/2007 | de Vries | |
| 7,246,063 B2 | 7/2007 | James et al. | |
| 7,254,634 B1 | 8/2007 | Davis et al. | |
| 7,287,054 B2 | 10/2007 | Lee et al. | |
| 7,320,131 B1 | 1/2008 | O'Toole, Jr. | |
| 7,343,310 B1 | 3/2008 | Stender | |
| 7,346,616 B2 | 3/2008 | Ramanujam et al. | |
| 7,350,151 B1 | 3/2008 | Nakajima | |
| 7,356,563 B1 | 4/2008 | Leichtling et al. | |
| 7,363,342 B1 | 4/2008 | Wang et al. | |
| 7,418,711 B1 | 8/2008 | Lee et al. | |
| 7,451,196 B1 | 11/2008 | de Vries et al. | |
| 7,533,146 B1 | 5/2009 | Kumar | |
| 7,577,751 B2 | 8/2009 | Vinson et al. | |
| 7,620,901 B2 | 11/2009 | Carpenter et al. | |
| 7,624,185 B2 | 11/2009 | Miller et al. | |
| 7,647,370 B1 | 1/2010 | Liu et al. | |
| 7,650,444 B2 | 1/2010 | Dirstine et al. | |
| 7,656,799 B2 | 2/2010 | Samuels et al. | |
| 7,676,506 B2 | 3/2010 | Reinsch | |
| 7,703,024 B2 | 4/2010 | Kautzleben et al. | |
| 7,706,399 B2 | 4/2010 | Janczak | |
| 7,725,331 B2 | 5/2010 | Schurenberg et al. | |
| 7,783,568 B1 | 8/2010 | Fracchia et al. | |
| 7,802,183 B1 | 9/2010 | Essin | |
| 7,810,089 B2 | 10/2010 | Sundarrajan et al. | |
| 7,831,919 B1 | 11/2010 | Viljoen et al. | |
| 7,921,078 B2 | 4/2011 | McCuller | |
| 7,941,488 B2 | 5/2011 | Goodman et al. | |
| 7,950,026 B1 | 5/2011 | Urbach | |
| 7,966,572 B2 | 6/2011 | Matthews et al. | |
| 7,984,115 B2 | 7/2011 | Tien et al. | |
| 8,010,901 B1 | 8/2011 | Rogers | |
| 8,024,523 B2 | 9/2011 | de Vries et al. | |
| 8,065,166 B2 | 11/2011 | Maresh et al. | |
| 8,122,341 B1 | 2/2012 | Dayan et al. | |
| 8,195,146 B2 | 6/2012 | Prakash et al. | |
| 8,239,773 B1 | 8/2012 | Billman | |
| 8,261,345 B2 | 9/2012 | Hitomi et al. | |
| 8,356,252 B2 | 1/2013 | Raman et al. | |
| 8,359,591 B2 | 1/2013 | de Vries et al. | |
| 8,478,307 B1 | 7/2013 | Hayes | |
| 8,509,230 B2 | 8/2013 | Vinson et al. | |
| 8,527,591 B2 | 9/2013 | Pirnazar | |
| 8,527,706 B2 | 9/2013 | de Vries et al. | |
| 8,533,103 B1 | 9/2013 | Certain et al. | |
| 8,572,178 B1 | 10/2013 | Frazzini et al. | |
| 8,606,952 B2 | 12/2013 | Pasetto et al. | |
| 8,607,158 B2 | 12/2013 | Molander et al. | |
| 8,627,081 B2 | 1/2014 | Grimen et al. | |
| 8,650,154 B2 * | 2/2014 | Nair | G06F 16/93 707/610 |
| 8,667,054 B2 | 3/2014 | Tahan | |
| 8,832,260 B2 | 9/2014 | Raja et al. | |
| 8,856,259 B2 | 10/2014 | Burckart et al. | |
| 8,909,703 B2 | 12/2014 | Gupta et al. | |
| 8,910,112 B2 | 12/2014 | Li et al. | |
| 8,924,512 B2 | 12/2014 | Stoyanov et al. | |
| 8,935,328 B2 | 1/2015 | Tumuluri | |
| 9,152,970 B1 | 10/2015 | Trahan | |
| 9,239,812 B1 | 1/2016 | Berlin | |
| 9,256,856 B1 | 2/2016 | Fairs et al. | |
| 2001/0006382 A1 | 7/2001 | Sevat | |
| 2001/0033299 A1 | 10/2001 | Callaway et al. | |
| 2001/0037358 A1 | 11/2001 | Clubb et al. | |
| 2001/0047393 A1 | 11/2001 | Arner et al. | |
| 2002/0032751 A1 | 3/2002 | Bharadwaj | |
| 2002/0032783 A1 | 3/2002 | Tuatini | |
| 2002/0032804 A1 | 3/2002 | Hunt | |
| 2002/0051541 A1 | 5/2002 | Glick et al. | |
| 2002/0092029 A1 | 7/2002 | Smith | |
| 2002/0198941 A1 | 12/2002 | Gavrilescu et al. | |
| 2003/0014735 A1 | 1/2003 | Achlioptas et al. | |
| 2003/0023670 A1 | 1/2003 | Walrath | |
| 2003/0055893 A1 | 3/2003 | Sato et al. | |
| 2003/0065738 A1 | 4/2003 | Yang et al. | |
| 2003/0120324 A1 | 6/2003 | Osborn et al. | |
| 2003/0120762 A1 | 6/2003 | Yepishin et al. | |
| 2003/0149721 A1 | 8/2003 | Alfonso-Nogueiro et al. | |
| 2003/0149941 A1 | 8/2003 | Tsao | |
| 2003/0163514 A1 | 8/2003 | Waldschmidt | |
| 2003/0179230 A1 | 9/2003 | Seidman | |

(56) References Cited

U.S. PATENT DOCUMENTS

| | | |
|---|---|---|
| 2003/0184584 A1 | 10/2003 | Vachuska et al. |
| 2003/0208472 A1 | 11/2003 | Pham |
| 2004/0015842 A1 | 1/2004 | Nanivadekar et al. |
| 2004/0029638 A1 | 2/2004 | Hytcheson et al. |
| 2004/0039742 A1 | 2/2004 | Barsness et al. |
| 2004/0045017 A1 | 3/2004 | Dorner et al. |
| 2004/0068516 A1 | 4/2004 | Lee et al. |
| 2004/0077347 A1 | 4/2004 | Lauber et al. |
| 2004/0103195 A1 | 5/2004 | Chalasani et al. |
| 2004/0103339 A1 | 5/2004 | Chalasani et al. |
| 2004/0106916 A1 | 6/2004 | Quaid et al. |
| 2004/0117804 A1 | 6/2004 | Scahill et al. |
| 2004/0128354 A1 | 7/2004 | Horikiri et al. |
| 2004/0153525 A1 | 8/2004 | Borella |
| 2004/0162876 A1 | 8/2004 | Kohavi |
| 2004/0183827 A1 | 9/2004 | Putterman et al. |
| 2004/0236633 A1 | 11/2004 | Knauerhase et al. |
| 2004/0243919 A1 | 12/2004 | Muresan et al. |
| 2004/0249885 A1 | 12/2004 | Petropoulakis et al. |
| 2005/0005024 A1 | 1/2005 | Samuels et al. |
| 2005/0010871 A1 | 1/2005 | Ruthfield et al. |
| 2005/0021687 A1 | 1/2005 | Anastassopoulos et al. |
| 2005/0050229 A1 | 3/2005 | Comeau et al. |
| 2005/0114711 A1 | 5/2005 | Hesselink et al. |
| 2005/0114789 A1 | 5/2005 | Chang et al. |
| 2005/0138631 A1 | 6/2005 | Bellotti et al. |
| 2005/0154288 A1 | 7/2005 | Wang |
| 2005/0188046 A1 | 8/2005 | Hickman et al. |
| 2005/0188313 A1 | 8/2005 | Matthews et al. |
| 2005/0190203 A1 | 9/2005 | Gery et al. |
| 2005/0193062 A1 | 9/2005 | Komine et al. |
| 2005/0198578 A1 | 9/2005 | Agrawala et al. |
| 2005/0216421 A1 | 9/2005 | Barry et al. |
| 2005/0240906 A1 | 10/2005 | Kinderknecht et al. |
| 2005/0246422 A1 | 11/2005 | Laning |
| 2006/0004874 A1 | 1/2006 | Hutcheson et al. |
| 2006/0026006 A1 | 2/2006 | Hindle |
| 2006/0031377 A1 | 2/2006 | Ng et al. |
| 2006/0031481 A1 | 2/2006 | Patrick et al. |
| 2006/0036770 A1 | 2/2006 | Hosn et al. |
| 2006/0041686 A1 | 2/2006 | Caspi et al. |
| 2006/0041891 A1 | 2/2006 | Aaron |
| 2006/0053380 A1 | 3/2006 | Spataro et al. |
| 2006/0066717 A1 | 3/2006 | Miceli |
| 2006/0069797 A1 | 3/2006 | Abdo et al. |
| 2006/0085245 A1 | 4/2006 | Takatsuka et al. |
| 2006/0085835 A1 | 4/2006 | Istvan et al. |
| 2006/0101397 A1 | 5/2006 | Mercer et al. |
| 2006/0112188 A1 | 5/2006 | Albanese et al. |
| 2006/0130069 A1 | 6/2006 | Srinivasan et al. |
| 2006/0179119 A1 | 8/2006 | Kurosawa et al. |
| 2006/0221081 A1 | 10/2006 | Cohen et al. |
| 2006/0231175 A1 | 10/2006 | Vondracek et al. |
| 2006/0236328 A1 | 10/2006 | DeWitt |
| 2006/0242254 A1 | 10/2006 | Okazaki et al. |
| 2006/0258462 A1 | 11/2006 | Cheng et al. |
| 2006/0265689 A1 | 11/2006 | Kuznetsov et al. |
| 2006/0271563 A1 | 11/2006 | Angelo et al. |
| 2006/0288171 A1 | 12/2006 | Tsien |
| 2006/0294418 A1 | 12/2006 | Fuchs |
| 2007/0024645 A1 | 2/2007 | Purcell et al. |
| 2007/0024706 A1 | 2/2007 | Brannon et al. |
| 2007/0047535 A1 | 3/2007 | Varma |
| 2007/0067754 A1 | 3/2007 | Chen et al. |
| 2007/0079244 A1 | 4/2007 | Brugiolo |
| 2007/0112880 A1 | 5/2007 | Yang et al. |
| 2007/0130292 A1 | 6/2007 | Tzruya et al. |
| 2007/0143398 A1 | 6/2007 | Graham |
| 2007/0203944 A1 | 8/2007 | Batra et al. |
| 2007/0203990 A1 | 8/2007 | Townsley et al. |
| 2007/0203999 A1 | 8/2007 | Townsley et al. |
| 2007/0208718 A1 | 9/2007 | Javid et al. |
| 2007/0226636 A1 | 9/2007 | Carpenter et al. |
| 2007/0233706 A1 | 10/2007 | Farber et al. |
| 2007/0244930 A1 | 10/2007 | Bartlette et al. |
| 2007/0244962 A1 | 10/2007 | Laadan et al. |
| 2007/0244990 A1 | 10/2007 | Wells |
| 2007/0256073 A1 | 11/2007 | Truong et al. |
| 2007/0282951 A1 | 12/2007 | Selimis et al. |
| 2008/0016155 A1 | 1/2008 | Khalatian |
| 2008/0028323 A1 | 1/2008 | Rosen et al. |
| 2008/0052377 A1 | 2/2008 | Light |
| 2008/0134211 A1 | 6/2008 | Cui |
| 2008/0146194 A1 | 6/2008 | Yang et al. |
| 2008/0159175 A1 | 7/2008 | Flack |
| 2008/0183190 A1 | 7/2008 | Adcox et al. |
| 2008/0195362 A1 | 8/2008 | Belcher et al. |
| 2008/0276183 A1 | 11/2008 | Siegrist et al. |
| 2008/0301228 A1 | 12/2008 | Flavin |
| 2008/0313282 A1 | 12/2008 | Warila et al. |
| 2008/0320081 A1 | 12/2008 | Shriver-Blake et al. |
| 2009/0070404 A1 | 3/2009 | Mazzaferri |
| 2009/0080523 A1 | 3/2009 | McDowell |
| 2009/0089742 A1 | 4/2009 | Nagulu et al. |
| 2009/0094369 A1 | 4/2009 | Woolbridge et al. |
| 2009/0106422 A1 | 4/2009 | Kriewall |
| 2009/0119644 A1 | 5/2009 | de Vries et al. |
| 2009/0164581 A1 | 6/2009 | Bove et al. |
| 2009/0172100 A1 | 7/2009 | Callanan et al. |
| 2009/0187817 A1 | 7/2009 | Ivashin et al. |
| 2009/0209239 A1 | 8/2009 | Montesdeoca |
| 2009/0217177 A1 | 8/2009 | DeGrazia |
| 2009/0254589 A1* | 10/2009 | Nair .................. G06F 16/275 |
| 2009/0044171 A1 | 12/2009 | Avadhanula |
| 2009/0328032 A1 | 12/2009 | Crow et al. |
| 2010/0012911 A1 | 1/2010 | Akinaga et al. |
| 2010/0017727 A1 | 1/2010 | Offer et al. |
| 2010/0018827 A1 | 1/2010 | Ueda |
| 2010/0061238 A1 | 3/2010 | Godbole et al. |
| 2010/0077058 A1 | 3/2010 | Messer |
| 2010/0082747 A1 | 4/2010 | Yue et al. |
| 2010/0115023 A1 | 5/2010 | Peled |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0223661 A1 | 9/2010 | Yang |
| 2010/0268762 A1 | 10/2010 | Pahlavan et al. |
| 2010/0268813 A1 | 10/2010 | Pahlavan et al. |
| 2010/0274858 A1 | 10/2010 | Lindberg et al. |
| 2010/0281107 A1 | 11/2010 | Fallows et al. |
| 2010/0306642 A1 | 12/2010 | Lowet |
| 2011/0047190 A1 | 2/2011 | Lee et al. |
| 2011/0058052 A1 | 3/2011 | Bolton |
| 2011/0113350 A1 | 5/2011 | Carlos et al. |
| 2011/0119716 A1 | 5/2011 | Coleman, Sr. |
| 2011/0128378 A1 | 6/2011 | Raji |
| 2011/0138016 A1 | 6/2011 | Jung et al. |
| 2011/0138283 A1 | 6/2011 | Marston |
| 2011/0145863 A1 | 6/2011 | Alsina et al. |
| 2011/0154302 A1 | 6/2011 | Balko et al. |
| 2011/0154464 A1 | 6/2011 | Agarwal et al. |
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0187652 A1 | 8/2011 | Huibers |
| 2011/0191438 A1 | 8/2011 | Huibers et al. |
| 2011/0191823 A1 | 8/2011 | Huibers |
| 2011/0213830 A1 | 9/2011 | Lopez et al. |
| 2011/0219419 A1 | 9/2011 | Reisman |
| 2011/0222442 A1 | 9/2011 | Cole et al. |
| 2011/0223882 A1 | 9/2011 | Hellgren |
| 2011/0246891 A1 | 10/2011 | Schubert et al. |
| 2011/0252152 A1 | 10/2011 | Sherry et al. |
| 2011/0314093 A1 | 12/2011 | Sheu et al. |
| 2012/0016904 A1 | 1/2012 | Mahajan et al. |
| 2012/0023418 A1 | 1/2012 | Frields et al. |
| 2012/0030275 A1 | 2/2012 | Boller et al. |
| 2012/0072833 A1 | 3/2012 | Song et al. |
| 2012/0072835 A1 | 3/2012 | Gross et al. |
| 2012/0079080 A1 | 3/2012 | Pishevar |
| 2012/0079111 A1 | 3/2012 | Luukkala et al. |
| 2012/0084713 A1 | 4/2012 | Desai et al. |
| 2012/0090004 A1 | 4/2012 | Jeong |

(56) References Cited

U.S. PATENT DOCUMENTS

| | | |
|---|---|---|
| 2012/0133675 A1 | 5/2012 | McDowell |
| 2012/0151373 A1 | 6/2012 | Kominac et al. |
| 2012/0154633 A1 | 6/2012 | Rodriguez |
| 2012/0159308 A1 | 6/2012 | Tseng et al. |
| 2012/0159356 A1 | 6/2012 | Steelberg |
| 2012/0169874 A1 | 7/2012 | Thomas et al. |
| 2012/0210242 A1 | 8/2012 | Burckart et al. |
| 2012/0210243 A1 | 8/2012 | Uhma et al. |
| 2012/0221792 A1 | 8/2012 | de Vries et al. |
| 2012/0226742 A1 | 9/2012 | Momchilov et al. |
| 2012/0233555 A1 | 9/2012 | Psistakis et al. |
| 2012/0245918 A1 | 9/2012 | Overton et al. |
| 2012/0246225 A1 | 9/2012 | Lemire et al. |
| 2012/0324032 A1 | 12/2012 | Chan |
| 2012/0324358 A1 | 12/2012 | Jooste |
| 2012/0331061 A1 | 12/2012 | Lininger |
| 2013/0007227 A1 | 1/2013 | Hitomi et al. |
| 2013/0013671 A1 | 1/2013 | Relan et al. |
| 2013/0031618 A1 | 1/2013 | Momchilov |
| 2013/0046815 A1 | 2/2013 | Thomas et al. |
| 2013/0054679 A1 | 2/2013 | Jooste |
| 2013/0070740 A1 | 3/2013 | Yovin |
| 2013/0086155 A1 | 4/2013 | Thomas et al. |
| 2013/0086156 A1 | 4/2013 | McFadzean et al. |
| 2013/0086652 A1 | 4/2013 | Kavantzas et al. |
| 2013/0110895 A1 | 5/2013 | Valentino et al. |
| 2013/0113833 A1 | 5/2013 | Larsson |
| 2013/0117474 A1 | 5/2013 | Ajanovic et al. |
| 2013/0120368 A1 | 5/2013 | Miller |
| 2013/0132485 A1 | 5/2013 | Thomas et al. |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0159709 A1 | 6/2013 | Ivory et al. |
| 2013/0179962 A1 | 7/2013 | Arai et al. |
| 2013/0208966 A1 | 8/2013 | Zhao et al. |
| 2013/0212483 A1 | 8/2013 | Brakensiek et al. |
| 2013/0297676 A1 | 11/2013 | Binyamin |
| 2014/0136667 A1 | 5/2014 | Gonsalves et al. |
| 2014/0240524 A1 | 8/2014 | Julia et al. |
| 2014/0241229 A1 | 8/2014 | Bertorelle et al. |
| 2014/0258441 A1 | 9/2014 | L'Heureux et al. |
| 2014/0298420 A1 | 10/2014 | Barton et al. |
| 2015/0026338 A1 | 1/2015 | Lehmann et al. |
| 2015/0067769 A1 | 3/2015 | Barton et al. |
| 2015/0319252 A1 | 11/2015 | Momchilov et al. |

FOREIGN PATENT DOCUMENTS

| | | |
|---|---|---|
| CN | 1278623 | 1/2001 |
| CN | 1499841 | 5/2004 |
| CN | 101539932 | 9/2009 |
| CN | 102129632 | 7/2011 |
| CN | 102821413 | 12/2012 |
| EP | 0349463 | 1/1990 |
| EP | 1422901 | 5/2004 |
| JP | 2007/084744 | 3/1995 |
| JP | 2002/055870 | 2/2002 |
| JP | 2004/206363 | 7/2004 |
| JP | 2004/287758 | 10/2004 |
| JP | 2005/031807 | 2/2005 |
| JP | 2005/521946 | 7/2005 |
| JP | 2008/099055 | 4/2008 |
| JP | 4405812 | 1/2010 |
| JP | 2010/256972 | 11/2010 |
| RU | 2295752 | 3/2007 |
| RU | 2298287 | 4/2007 |
| RU | 2305860 | 9/2007 |
| WO | 1998/025666 | 6/1998 |
| WO | 1998/058478 | 12/1998 |
| WO | 2001/016724 | 3/2001 |
| WO | 2001/091482 | 11/2001 |
| WO | 2002/009106 | 1/2002 |
| WO | 2003/032569 | 4/2003 |
| WO | 2003/083684 | 10/2003 |
| WO | 2008/011063 | 1/2008 |
| WO | 2008/087636 | 7/2008 |
| WO | 2011/087545 | 7/2011 |
| WO | 2012/093330 | 7/2012 |
| WO | 2012/127308 | 9/2012 |
| WO | 2013/024342 | 2/2013 |
| WO | 2013/046016 | 4/2013 |
| WO | 2013/072764 | 5/2013 |
| WO | 2013/076554 | 5/2013 |
| WO | 2013/109984 | 7/2013 |
| WO | 2013/128284 | 9/2013 |
| WO | 2013/153439 | 10/2013 |
| WO | 2014/033554 | 3/2014 |

OTHER PUBLICATIONS

Brandom, R., "Google Photos and the unguessable URL," The Verge, retrieved on Sep. 25, 2017 from https://www.theverg.com/2015/6/23/8830977/google-photos-security-public-url-privacy-protected, Jun. 23, 2015, 7 pages.

"Calgary Scientific Revolutionizes Application Sharing and Advanced Collaboration with PureWeb 3.0," Press Release, Jun. 21, 2011, 3 pages.

Coffman, Daniel, et al., "A Client-Server Architecture for State-Dependent Dynamic Visualizations on the Web," IBM T.J. Watson Research Center, 2010, 10 pages.

Federl, P., "Remote Visualization of Large Multi-dimensional Radio Astronomy Data Sets," Institute for Space Imaging Science, University of Calgary, 2012, pp. 1-10.

Federl, P., "Remote Visualization of Large Multi-dimensional Radio Astronomy Data Sets," Institute for Space Imaging Science, University of Calgary, 2012, pp. 11-22.

Fraser, N., "Differential Synchronization," Google, Mountain View, CA, Jan. 2009, 8 pages.

GoInstant, Shared Browsing Technology, http://website.s3.goinstant.com.s3.amazonaws.com/wp-content/uploads/2012/04/GoInstant-Shared-Web-Technology.pdf, 2012, 4 pages.

"GTK 3, Broadway and an HTML5 websocket gui, for free," retrieved on Sep. 26, 2017 at http://compsci.ca/v3/viewtopic.php?t=36823, Apr. 12, 2014, pp. 1-3.

Hong, C., et al., "Multimedia Presentation Authoring and Virtual Collaboration in Medicine," International Journal of Kimics, vol. 8, No. 6, 2010, pp. 690-696.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Layers: Capture Every Item on Your Screen as a PSD Layered Image, Internet Website, retrieved on Jun. 30, 2016 at http://web.archive.org/web/20140218111143, 2014, 9 pages.

Li, S.F., et al., "Integrating Synchronous and Asynchronous Collaboration with Virtual Network Computing," Internet Computing, IEEE 4.3, 2000, pp. 26-33.

Luo, Y., et al., "Real Time Multi-User Interaction with 3D Graphics via Communication Networks," 1998 IEEE Conference on Information Visualization, 1998, 9 pages.

Microsoft Computer Dictionary, Microsoft Press, $5^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

Samesurf web real-time co-browser application, http://i.samesurf.com/i/0586021, 2009, 2 pages.

(56) References Cited

OTHER PUBLICATIONS

Shim, H., et al., Providing Flexible Services for Managing Shared State in Collaborative Systems, Proceedings of the Fifth European Conference, 1997, pp. 237-252.
Yang, L., et al., "Multirate Control in Internet-Based Control Systems," IEEE Transactions on Systems, Man, and Cybernetics: Part C: Applications and Reviews, vol. 37, No. 2, 2007, pp. 185-192.
European Search Report, dated Mar. 3, 2015, received in connection with European Patent Application No. 09828497.9.
Search Report and Written Opinion, dated Nov. 16, 2015, received in connection with SG Patent Application No. 2013087150.

\* cited by examiner

METHOD AND SYSTEM FOR PROVIDING REMOTE ACCESS TO A STATE OF AN APPLICATION PROGRAM

CROSS-REFERENCE TO RELATED APPLICATIONS

This application is a continuation of U.S. patent application Ser. No. 15/868,173 filed Jan. 11, 2018, entitled "METHOD AND SYSTEM FOR PROVIDING REMOTE ACCESS TO A STATE OF AN APPLICATION PROGRAM," which is a continuation of U.S. patent application Ser. No. 15/166,515 filed May 27, 2016, entitled "METHOD AND SYSTEM FOR PROVIDING REMOTE ACCESS TO A STATE OF AN APPLICATION PROGRAM," now U.S. Pat. No. 9,871,860, which is a continuation of U.S. patent application Ser. No. 14/450,491 filed Aug. 4, 2014, entitled "METHOD AND SYSTEM FOR PROVIDING REMOTE ACCESS TO A STATE OF AN APPLICATION PROGRAM," now U.S. Pat. No. 9,367,365, which is a continuation of U.S. patent application Ser. No. 12/592,473, filed Nov. 25, 2009, entitled "METHOD AND SYSTEM FOR PROVIDING REMOTE ACCESS TO A STATE OF AN APPLICATION PROGRAM," now U.S. Pat. No. 8,799,354, and claims the benefit of priority to U.S. Provisional Patent Application No. 61/193,423 filed Nov. 26, 2008. The disclosure of each of the aforementioned patent applications is incorporated herein by reference in its entirety.

FIELD OF THE INVENTION

The instant invention relates to computer networking and in particular to a method and system for providing remote access to a state of an application via a computer network.

BACKGROUND

Healthcare institutions, such as hospitals and diagnostic clinics, utilize information systems such as Hospital Information Systems (HIS), Radiology Information Systems (RIS), Clinical Information Systems (CIS), Picture Archive and Communication Systems (P ACS), Library Information Systems (LIS), Electronic Medical Records (EMR), to name a few. Information stored and processed in such systems includes, for example, patient medical histories, imaging data, test results, diagnosis information, management information, and scheduling information. The information is stored centrally or divided at a plurality of locations of a computer network—typically comprising a client-server architecture. Healthcare practitioners access the patient information or other information at various time instants and locations using sophisticated software application programs to gather, analyze, manipulate, and store data.

For example, using a PACS workstation a radiologist performs an image reading for a diagnosis based on content of diagnostic images and reports the results electronically in a patient application file. Because of the large volume of data and intensive computing requirements, the software used to perform this task typically requires dedicated workstation hardware and high bandwidth network access to the diagnostic images. As a consequence, there is limited or no access to the diagnostic information and analysis capability off-site from the P ACS workstation. This limits the ability of radiologists, technicians, and other specialists who are not on-site to be able to gain access to the necessary software and data to provide timely diagnosis, for example, in an urgent situation.

Presently, this problem is typically overcome by providing remote network access to the screen or console of the workstation hardware, or by downloading sensitive data such as, for example, diagnostic data, to a remote system. In the first case, remote access software does not have any special knowledge of the application programs that are executed and are not able to optimize the presentation of the display of the application program to the user based on the state of the application program—resulting in inefficient use of network bandwidth and poor performance for the remote user. In the second case, the transmission of patient related information to an uncontrolled remote site is a security risk for such sensitive information, and furthermore, in the case of diagnostic imaging data, requires transmission of large amounts of information which is beyond the capacity of many networks.

SUMMARY OF EMBODIMENTS OF THE INVENTION

In accordance with embodiments of the present invention there is provided a method for providing remote access to a state of an application. The method may include providing remote access to an application program being executed on a server computing device by establishing over a network, a remote connection at the server computing device with a client computing device to enable the remote access to the application program; communicating, over the remote connection, a difference program containing data representing a change in a state of the application made by either execution of the application program or the client computing device, the difference program capturing changes in the state of the application program since the state of the application was last received by the server computing device or the client computing device; and synchronizing, between the server computing device and the client computing device, the change in the state of the application using the difference program.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While embodiments of the invention will be described for patient application files in a clinical environment only for the sake of simplicity, it will become evident to those skilled in the art that the embodiments of the invention are not limited thereto, but are applicable in numerous other fields where users remotely access a state of an application program via a computer network.

Figure 1:
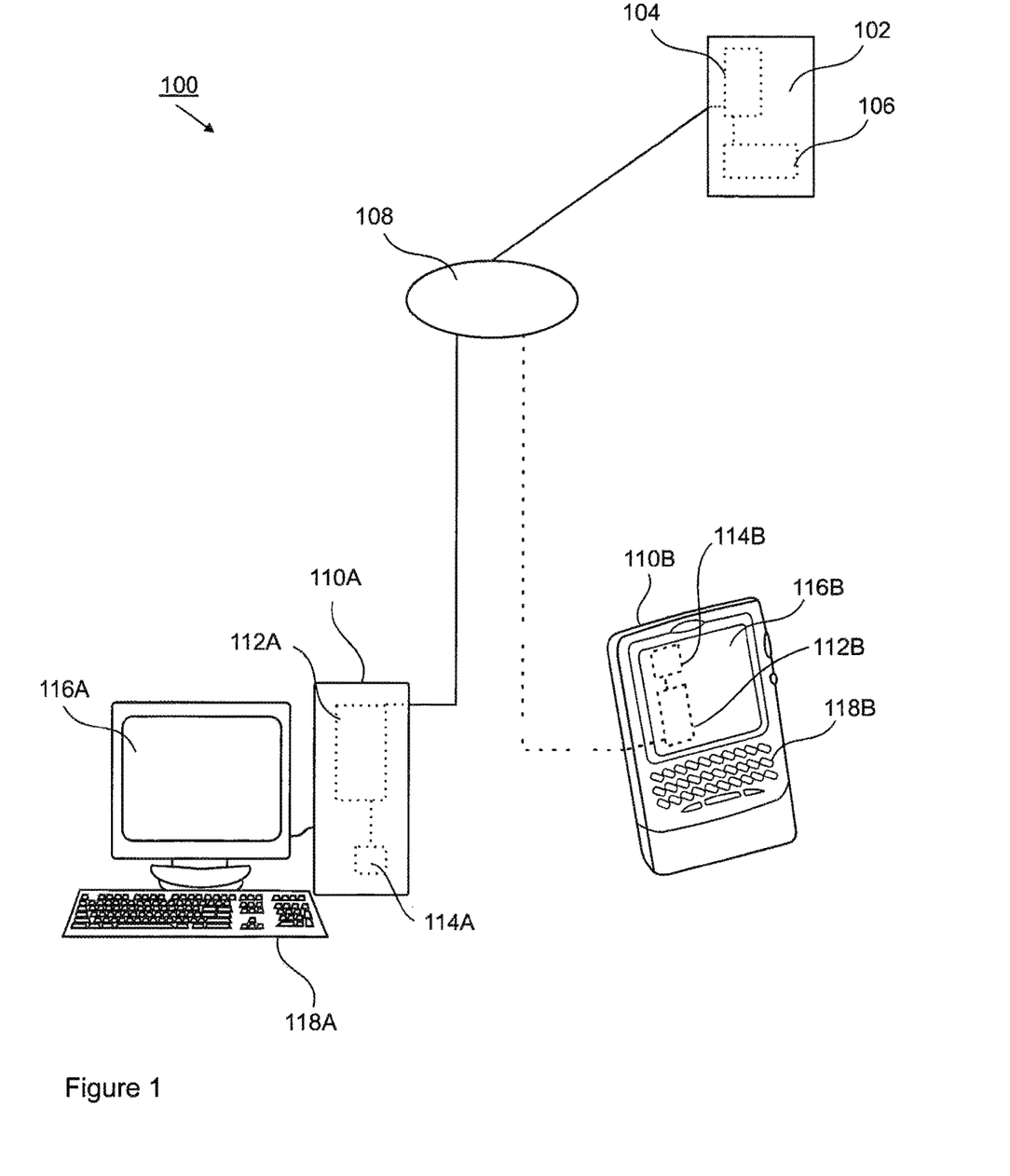
FIG. 1 is a simplified block diagram of a system for providing remote access to a state of an application according to a preferred embodiment of the invention.

Referring to FIG. 1, a system 100 for providing remote access to the state of an application according to a preferred embodiment of the invention is shown. The system comprises a plurality of client computers 110A, 110B—for example, workstations, personal computers, laptop computers, and/or wireless handheld devices—connected via a communication network 108 to a server computer 102—for example, a central computer or a high performance workstation. For example, in a clinical environment numerous tasks executed on the system 100 are related to: viewing medical images of a patient and entering a diagnostic report into a respective patient application file; and for entering other information such as scheduling information of the patient's appointments with medical practitioners. The communication network 108 comprises, for example, a Local Area Network (LAN) connecting the client computers with one or more server computers within an organization such as, for example, a hospital. Alternatively, the communication network 108 comprises a Wide Area Network (WAN) or the Internet connecting client computers of various organizations such as, for example, hospitals, diagnostic clinics, and family physicians offices.

In the system 100 an application program for performing an application associated therewith is executed on processor 104 of the server computer 102, for example, by executing executable commands stored in memory 106. For example, applications enable: viewing and modifying of medical images, viewing and modifying of a patient file, entering a diagnostic report, and scheduling a patient's appointments. A state of an application is changed, for example, when a user changes information in a patient file or requests a different view of a medical image.

For example, using the system 100 a radiologist is enabled to perform an image reading for a diagnosis by remotely accessing an imaging application executed on a dedicated P ACS workstation and to enter a report into a patient file by remotely accessing a patient file application.

Typically, an application such as, for example, the patient file application is processed at different client computers 110A, 110B connected via the communication network 108 to the server computer 102. For example, at client computer 110B a medical practitioner enters his diagnosis of a medical image into the patient application file while at client computer 110A a health care worker enters scheduling information for an appointment into the patient application file. The processing of the same patient file application at two different client computers 110A, 110B results in different states of the patient file application.

The system 100 provides remote access as well as synchronizes the states of an application by executing a method for providing remote access to the state of an application according to embodiments of the invention, as will be described herein below. The method for providing remote access to the state of an application is performed, for example, by executing a remote access program on processors 112A, 112B. For example, the remote access program is performed by executing executable commands stored in memory 114A, 114B. The remote access program is in communication with a remote server access program executed on the processor 104 of the server computer 102, which is in communication with the application program. Alternatively, the remote access program is in direct communication with the application program. When performing the method for providing remote access to the state of an application, the processor of the server computer 102 communicates with respective processors 112A, 112B of the client computers 110A, 110B using standard communication protocols such as, for example, Hyper Text Transfer Protocol (HTTP)—of the communication network 108, which are well known to those skilled in the art.

In the method for providing remote access to the state of an application, "view data" of the state of the application are generated and transmitted in a fashion according to hardware capabilities of the client computer—for example, processing capacity, memory size, type of graphical display, and type of user interface. For example, "view data" generated and transmitted for a personal computer are different from "view data" generated and transmitted for a wireless handheld device. For example, during a remote access a user modifies data of a patient file. First, "view data" indicative of the data of the patient file are generated at the server computer and transmitted to the client computer where the "view data" are displayed. The user using a user interface of the client computer then provides data indicative of a change of data of the patient file as "view data" which are then encoded and transmitted to the server computer. The server computer then changes the state of the application in dependence upon the data indicative of a change provided by the user and the application then stores data in dependence thereupon in the patient file stored in a database. Using "view data" enables presentation of the state of an application without transmitting sensitive and/or voluminous diagnostic data and avoids replicating of the application's data processing on the client computer.

Figure 2:
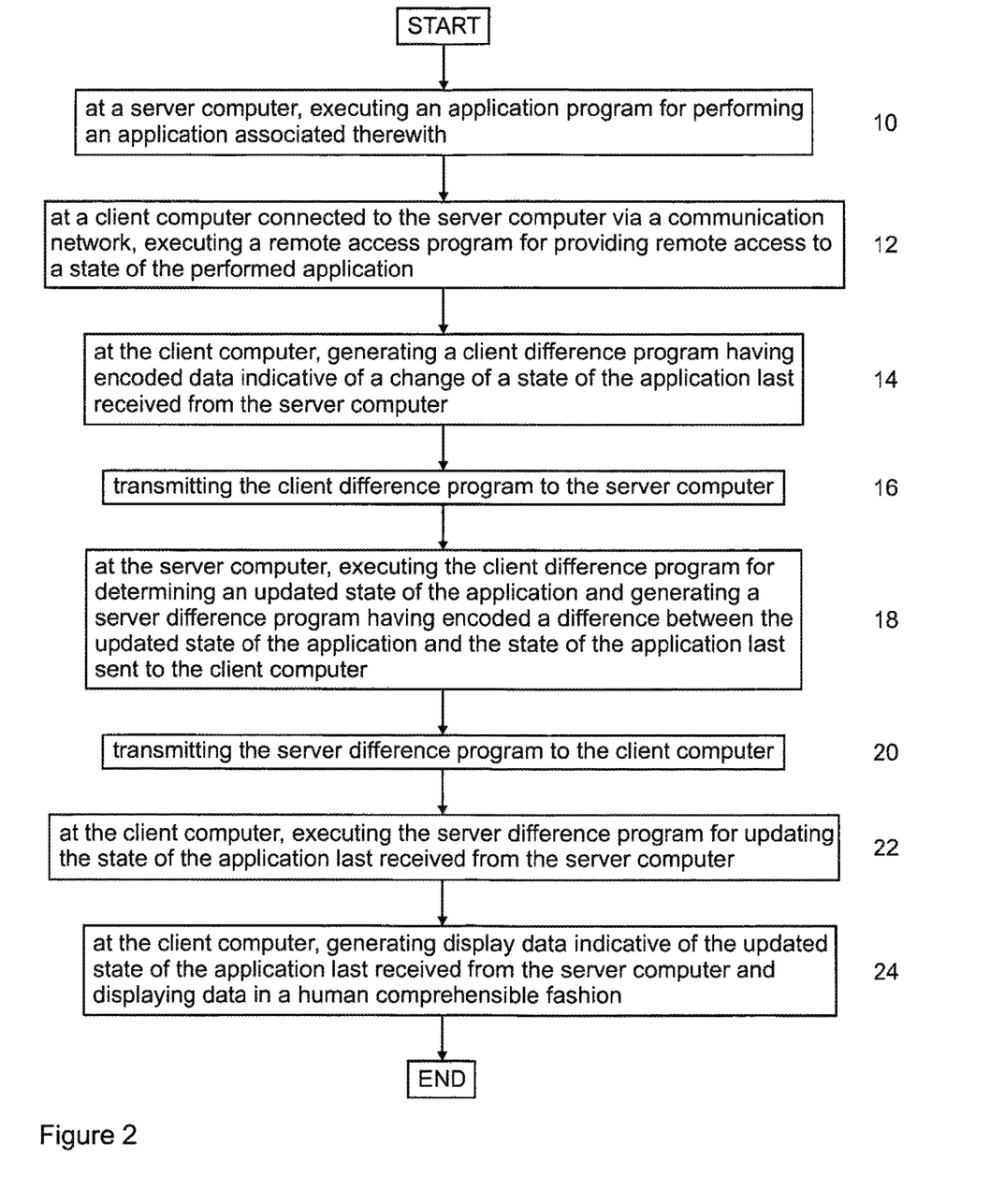
FIGS. 2 to 4 are simplified flow diagrams of a method for providing remote access to a state of an application according to a preferred embodiment of the invention.

Referring to FIG. 2, a method for providing remote access to the state of an application according to a preferred embodiment of the invention is shown. At the server computer 102 an application program for performing an application associated therewith is executed—10—on processor 104. At client computer 110A connected to the server computer 102, via the communication network 108 a remote access program is executed—12—on processor 112A for providing remote access to a state of the performed application. At the client computer 110A a client difference program is generated—14. The client difference program has encoded data indicative of a change of a state of the application last received from the server computer 102. The data indicative of a change of a state of the application are, for example, received from a user interface 118A, 118B of the client computer 110A, 110B, respectively.

The difference programs comprise executable commands for execution by a processor. The encoded data are indicative of: a path to the change in the state of the application; a type of the change; and a value of the change. The type of change is, for example, a "modification", a "deletion", or an "insertion", with the value for deletion changes being empty. An example of a difference program is:

Path="Patient/Name/First"
Type="Modification"
Value="Jane"
Path="Patient/Hobby"
Type="Insertion"

Value="Knitting"
Path="Patient/Career"
Type="Deletion"
Value=" "

The client difference program is then transmitted—16—to the server computer 102 via the communication network 108. At the server computer 102 the client difference program is executed—18—for determining an updated state of the application followed by generating a server difference program. The server difference program has encoded a difference between the updated state of the application and the state of the application last sent to the client computer, 110A. This difference also captures changes, for example, received from another client computer—for example, client computer 110B—or generated due to execution of the application program in dependence upon the executed client difference program for determining the updated state of the application. The server difference program is then transmitted—20—to the client computer 110A via the communication network 108. At the client computer 110A the server difference program is executed—22—for updating the state of the application last received from the server computer 102. Display data indicative of the updated state of the application last received from the server computer 102 are generated—24—and displayed in a human comprehensible fashion on display 116A. Optionally, step 24 is omitted, for example, in situations where the updated state of the application does not affect the data displayed on the display 116A.

Preferably, a remote server access program is executed on the processor 104 of the server computer 102 for executing the client difference program; communicating with the application program for determining the updated state of the application; and generating the server difference program. Provision of the remote server access program enables remote access to off-the-shelf application programs, increases substantially flexibility for the provision of the remote access absent modifications of the application program, and substantially facilitates implementation of the remote access as a retrofit. Alternatively, the application program is enabled to perform the operations of the remote server access program.

Further preferably, the method for providing' remote access to the state of an application enables limited access to a predetermined portion of the state of the application. For example, the limited access is enabled for:

meeting hardware capabilities for example, processing capacity, memory size, type of graphical display, and type of user interface—of the client computer—for example, the hardware capabilities of a personal computer are substantially different to the hardware capabilities of a wireless handheld device;

being compatible with different operating systems of different client computers; and, implementing user access restrictions to information for providing different users with different access to the state of an application—for example, an administrative user for scheduling a patient's appointments is prevented from accessing diagnostic information of the patient.

Further preferably, the method for providing remote access to the state of an application enables remote access for a plurality of client computers 110A, 1106, which are, for example, simultaneously, connected to the server computer 102 via the communication network 108 for accessing the state of a same application.

Figure 3:
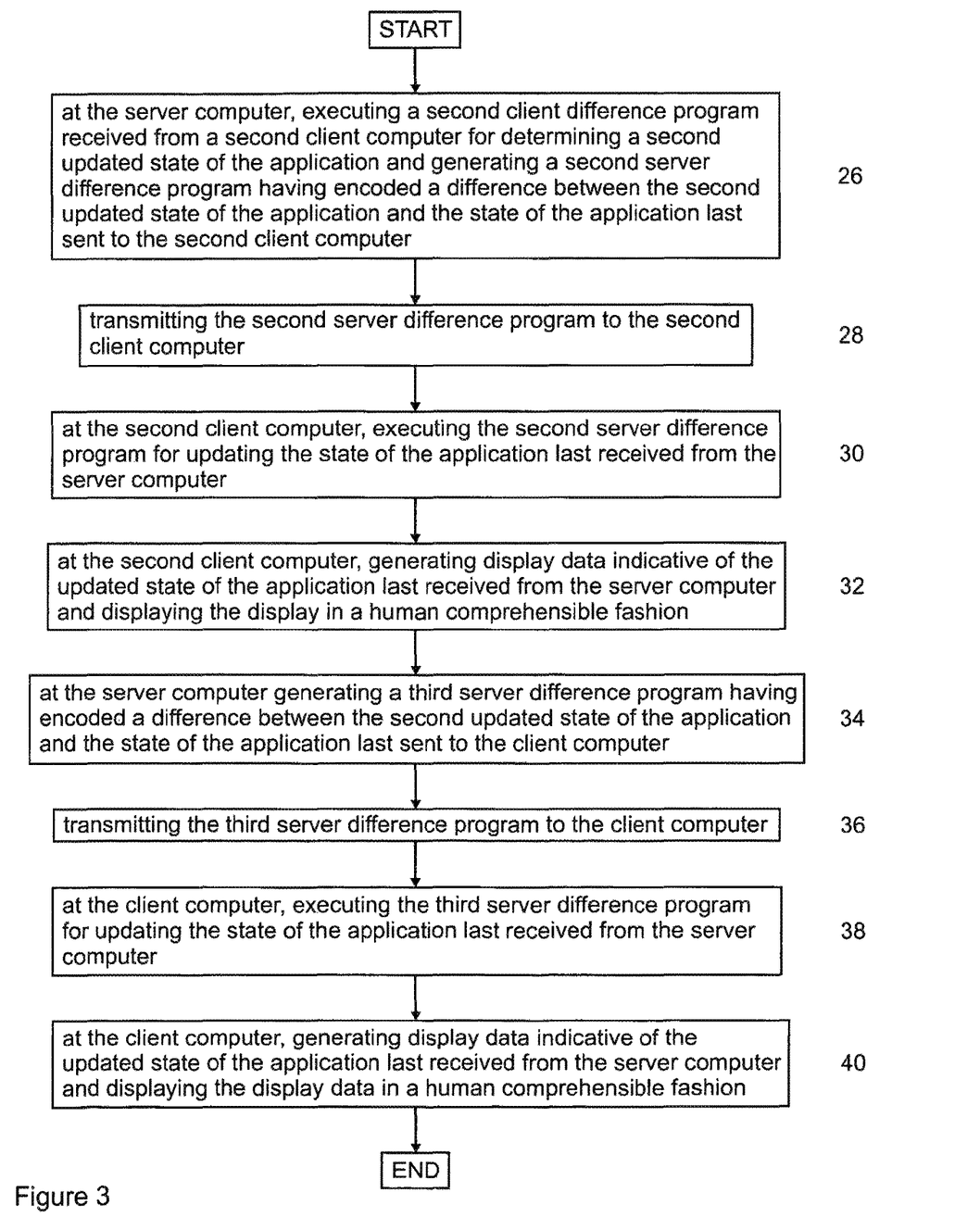

As illustrated in FIG. 3, upon receipt a second client difference program received from a second client computer 110B is executed—26—at the server computer 102 for determining a second updated state of the application followed by generating a second server difference program. The second server difference program has encoded a difference between the second updated state of the application and the state of the application last sent to the second client computer. The second server difference program is then transmitted—28—to the second client computer 110B via the communication network 108. At the second client computer 110B the second server difference program is executed—30—for updating the state of the application last received from the server computer 102. Display data indicative of the updated state of the application last received from the server computer 102 are generated—32—and displayed in a human comprehensible fashion on display 116B. Optionally, step 32 is omitted, for example, in situations where the updated state of the application does not affect the data displayed on the display 116B.

At the server computer 102 a third server difference program is generated 34. The third server difference program has encoded a difference between the second updated state of the application and the state of the application last sent to the client computer 110A. The third server difference program is then transmitted—36—to the client computer 110A via the communication network 108. At the client computer 110A the third server difference program is executed—38—for updating the state of the application last received from the server computer 102. Display data indicative of the updated state of the application last received from the server computer 102 are generated—40—and displayed in a human comprehensible fashion on display 116A. Optionally, step 40 is omitted, for example, in situations where the updated state of the application does not affect the data displayed on the display 116A. Preferably, the steps 34 to 40 are executed simultaneously to the execution of steps 26 to 32. Alternatively, the steps 34 to 40 are omitted and the changes received from the second client computer 110B are provided to the client computer 110A after receipt of a client difference program from the client computer 110A.

Figure 4:
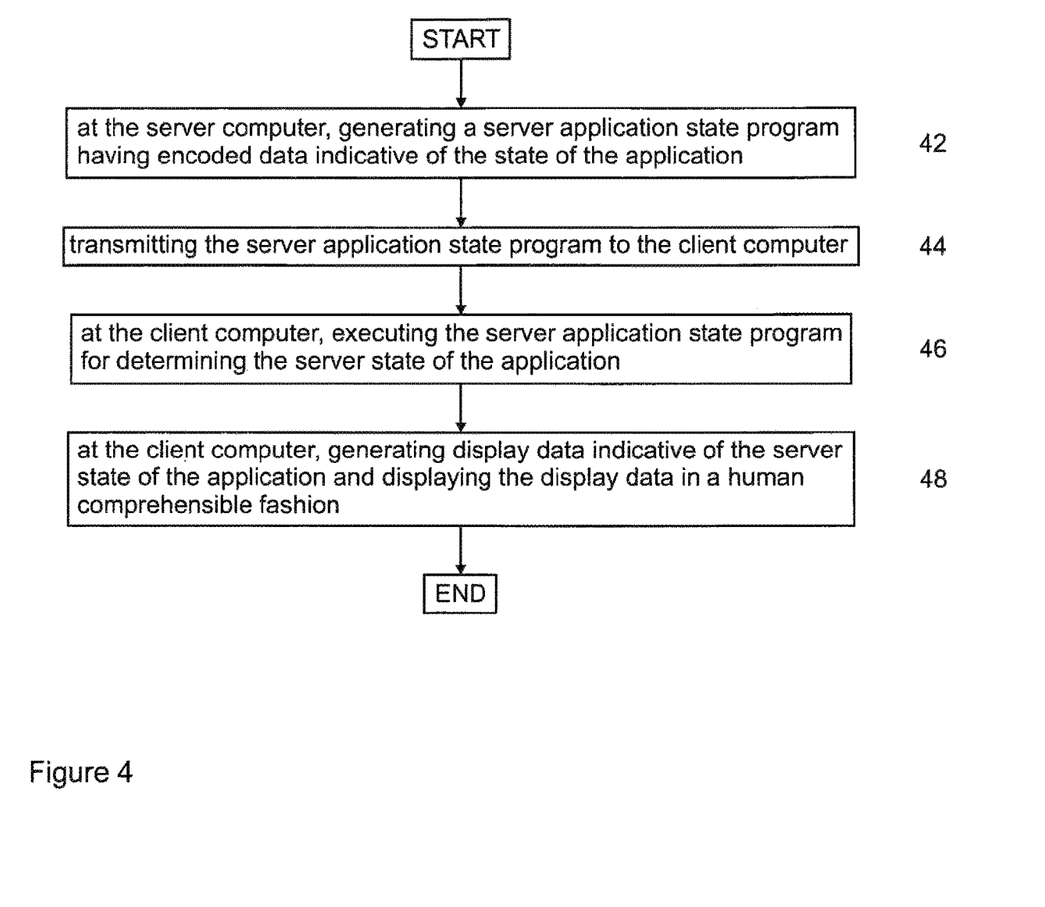

Upon initiation of the remote access for the client computer a state of the application is provided as illustrated in FIG. 4. Upon receipt of a request from the client computer 110A for the state of the application a server application state program is generated—42—at the server computer 102. The server application state program has encoded data indicative of the state of the application. The server application state program is then transmitted—44—to the client computer 110A via the communication network 108. At the client computer 110A the server application state program is executed—46—for determining the server state of the application. Display data indicative of the server state of the application are generated—48—and displayed in a human comprehensible fashion on display 116A. Optionally, the steps 42 to 48 are also performed during provision of the remote access to ensure a provision of a same state of the application at the server computer 102 and the client computer 110A. For example, the steps 42 to 48 are performed in predetermined time intervals or after data loss during transmission. Further optionally, step 48 is omitted, for example, in situations where the updated state of the application does not affect the data displayed on the display 116A.

Figure 5:
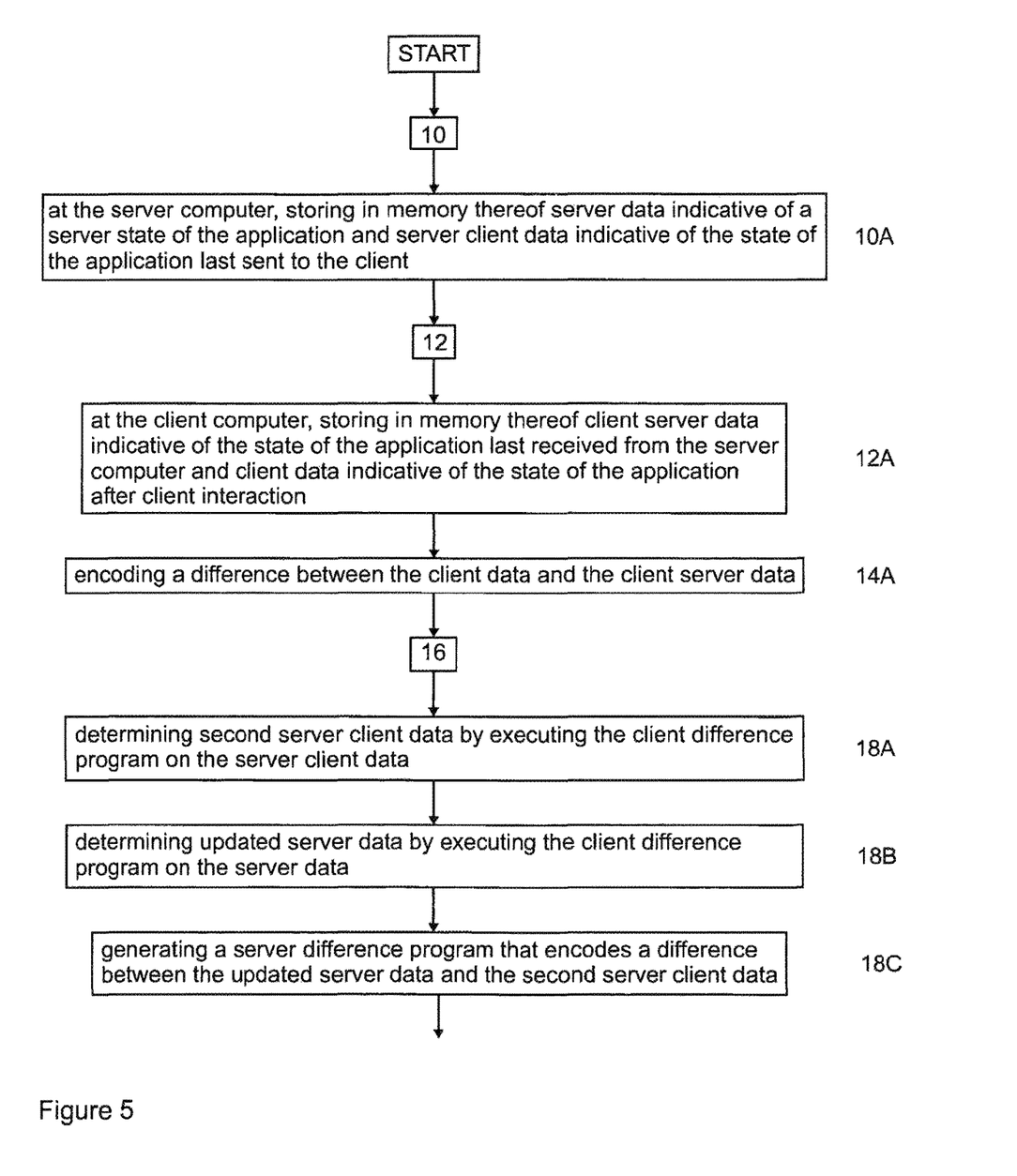
FIG. 5 is a simplified flow diagram of a preferred implementation of the method for providing remote access to a state of an application illustrated in FIG. 2.

Referring to FIG. 5, a preferred implementation of the method for providing remote access to the state of an application is illustrated—with reference to the method shown in FIG. 2. In the memory 106 of the server computer 102 data indicative of a state of the application such as, for example, a patient file application, are stored—10A—in two states thereof: server data indicative of the server state of the application—the state of the application at the server (and possibly changed by the server); and, server client data indicative of the state of the application last sent to the client computer 110A. In the memory 114A of the client computer 110A data indicative of a state of the application are stored—12A—in two states thereof: client server data indicative of the state of the application last received from the server computer 102; and, client data indicative of the state of the application after client interaction. In step 14 a difference between the state of the application after client interaction and the state of the application last received from the server computer is encoded—14A—with the difference being the difference between the client data and the client server data. In step 18: second server client data are determined—18A—by executing the client difference program on the server client data; updated server data are determined—18B—by executing the client difference program on the server data; a server difference program is generated—18C—that encodes a difference between the updated server data and the second server client data; third server client data are determined—18D—by executing the server difference program on the second server client data; and, the server client data are replaced—18E—with the third server client data. Optionally, a locking process is provided for locking the server data in order to prevent the same from being modified by other processes prior step 18B, which is released, for example, after step 18C. In step 22: second client server data are determined—22A—by executing the server difference program on the client server data; second client data are determined—22B—by executing the server difference program on the client data; the client server data are replaced—22C—with the second client server data; and, the client data are replaced—22D—with the second client data. Optionally, a locking process is provided for locking the client server data and the client data during execution of the steps 22A to 22D.

Figure 6:
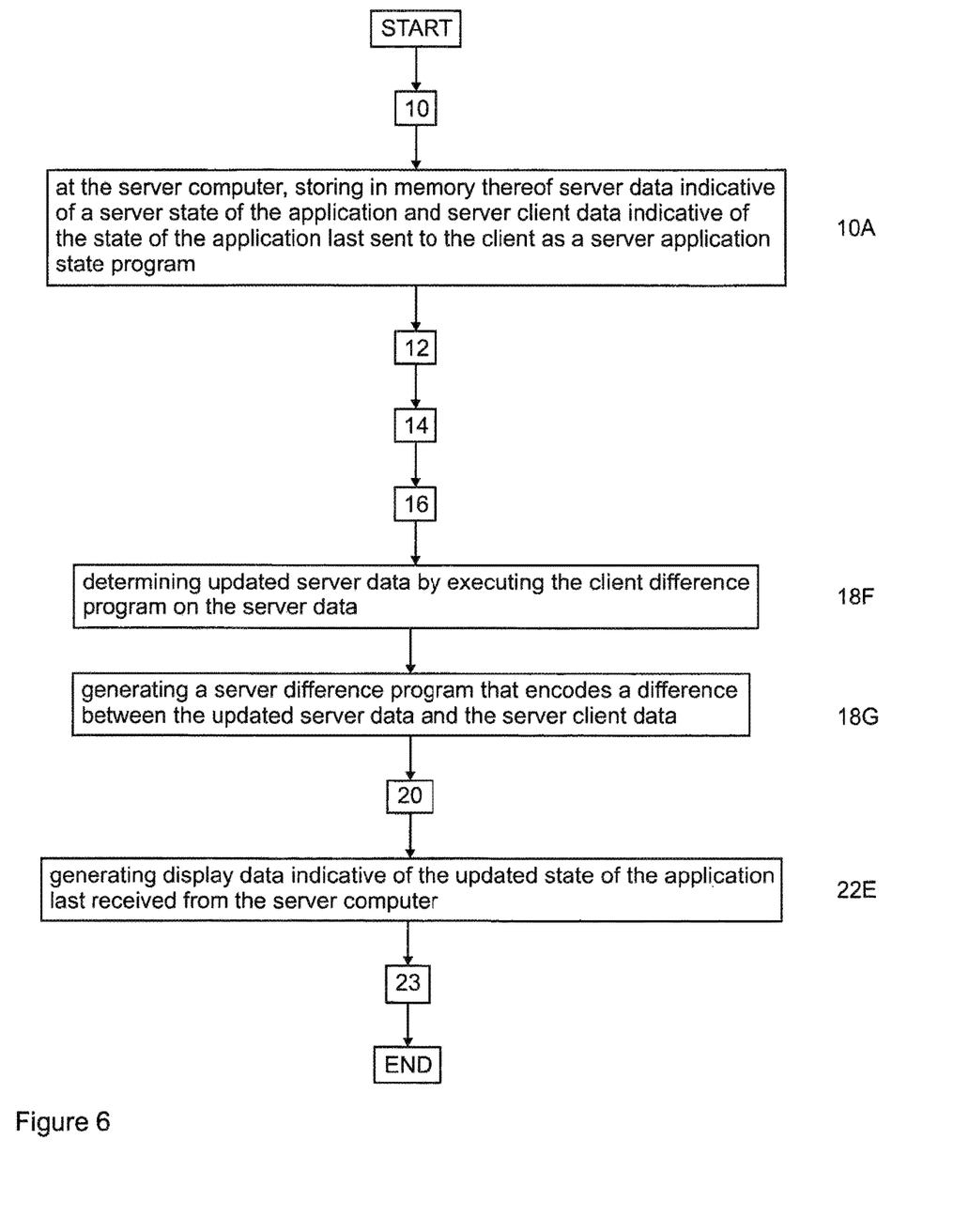
FIG. 6 is a simplified flow diagram of another implementation of the method for providing remote access to a state of an application illustrated in FIG. 2.

Referring to FIG. 6, an alternative implementation of the method for providing remote access to the state of an application is illustrated—with reference to the method shown in FIG. 2. In the memory 106 of the server computer 102 data indicative of a state of the application are stored—10A—in two states thereof: server data indicative of the server state of the application—the state of the application at the server computer (and possibly changed by the server computer); and, server client data indicative of the state of the application last sent to the client computer 110B as a server state application program. In step 18: updated server data are determined—18F—by executing the client difference program on the server data; and, a server difference program is generated 18G—that encodes a difference between the updated server data and the server client data. In step 22 display data indicative of the updated state of the application last received from the server computer are directly generated—22E—by executing the received server difference program and displayed—23—in a human comprehensible fashion on display 116B. This implementation obviates storage of data related to the state of the application in memory of the client computer 110B which is beneficial for client computers having limited storage capacity such as hand held devices. Preferably, a server application state program that has encoded data indicative of the server state of the application is generated and transmitted, as disclosed herein above, to the client computer, for example, in predetermined time intervals.

As is evident to those skilled in the art, the embodiments of the system 100 and method for providing remote access to the state of an application according to the invention have been described with respect to a client-server network architecture comprising two client computers for the sake of simplicity but are not limited thereto and are applicable for other network architectures as well as various numbers of client computers.

The embodiments of the method for providing remote access to the state of an application are performed, for example, by executing executable commands stored in storage mediums—for example, the memory 106 using processor 104 of the server computer 102 and the memory 114A using the processor 112A of the client computer 110A. The executable commands for being stored in the memory of the client computers are, for example, transmitted from the server computer 102 via the communication network 108.

The present invention has been described herein with regard to preferred embodiments. However, it will be obvious to persons skilled in the art that a number of variations and modifications can be made without departing from the scope of the invention as described herein.

What is claimed:

1. A method of synchronizing a view of an application between a server computer and a client computer, comprising:
   executing a server remote access program on the server computer;
   executing a client remote access program on the client computer;
   determining, by the server remote access program, changes to the application made by execution of the application;
   determining, by the client remote access program, changes to the application made by user inputs received at the client computer;
   communicating view data representing the changes to the application over a communication connection between the server remote access program and the client remote access program; and
   updating, in accordance with the view data, a display of the application in a user interface presented at the client computer.

2. The method of claim 1, further comprising establishing the communication connection over a computer network to which the server computer and the client computer are communicatively connected.

3. The method of claim 1, further comprising encoding the view data in a predetermined format indicative of changes made since a last communication of data representing the changes was received at the server remote access program or the client remote access program.

4. The method of claim 1, wherein encoded changes are indicative of at least one of a path to the change in the state of the application program, a type of the change, and a value of the change.

5. The method of claim 1, further comprising:
   executing a second client remote access program on a second client computer;
   determining changes to the application made by either execution of the application, by user inputs received at the client computer or by user inputs received at the second client computer;
   communicating view data representing the changes over respective communication connections between the server remote access program and each of the client remote access program and the second client remote access program; and updating, in accordance with the data, the display of the application in a user interface presented at the client computer and the second client computer.

6. The method of claim 5, further comprising encoding the view data in a predetermined format indicative of changes made since a last communication of data representing the changes was received at the server remote access program, the client remote access program or the second client remote access program.

7. The method of claim 1, further comprising generating the view data in accordance with hardware capabilities of the client computing device.

8. The method of claim 1, further comprising generating the view data in accordance with access restrictions associated with a user of the client computer.

9. The method of claim 1, further comprising generating the view data to prevent the transmission of sensitive information to the client computer.

10. A method of synchronizing a view of an application between a server computer and a client computer, comprising:

executing a server remote access program on the server computer;

executing a plural client remote access programs wherein each client remote access program is on a respective one of plural client computers;

determining, by the server remote access program, changes to the application made by execution of the application;

determining, by at least one of the plural client remote access programs, changes to the application made by user inputs received by at least one of the plural the client computers;

communicating view data representing the changes over a respective one of plural communication connections between the server remote access program and each of the plural client remote access programs; and updating, in accordance with the view data, a display of the application in a user interface presented by at least one of the plural client computers.

11. The method of claim 10, further comprising establishing the plural communications connection over a computer network to which the server computer and each of the plural client computers are communicatively connected.

12. The method of claim 10, further comprising encoding the changes as view data having a predetermined format indicative of changes made since a last communication of data representing the changes was received at the server remote access program or at least one of the plural client remote access programs.

13. The method of claim 12, wherein encoded changes are indicative of at least one of a path to the change in the state of the application program, a type of the change, and a value of the change.

14. The method of claim 10, further comprising generating the view data in accordance with hardware capabilities of the client computing device.

15. The method of claim 10, further comprising generating the view data in accordance with access restrictions associated with a user of the client computer.

16. The method of claim 10, further comprising generating the view data to prevent the transmission of sensitive information to the client computer.

* * * * *